No. 837,985. PATENTED DEC. 11, 1906.
A. E. WALBURN.
DRAFT EQUALIZER.
APPLICATION FILED MAY 4, 1906.
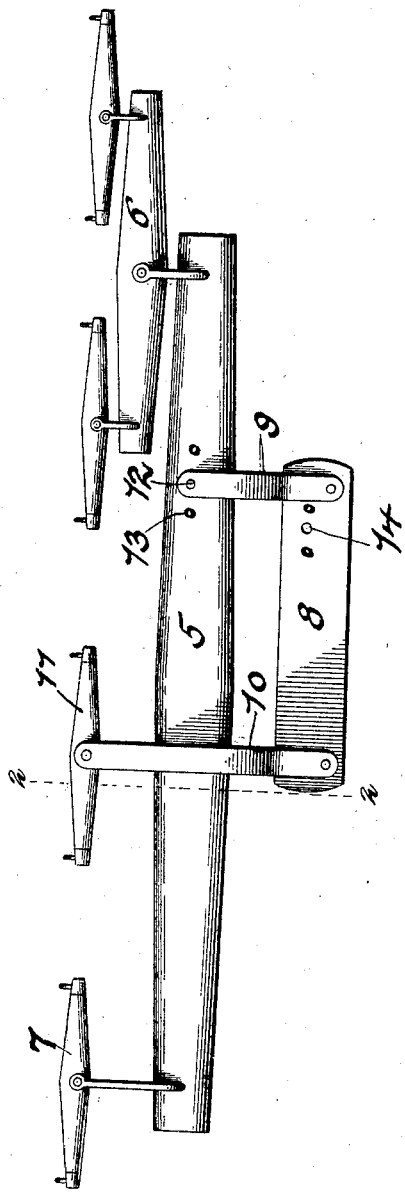
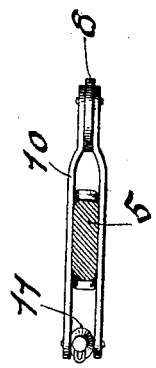
WITNESSES:
W. H. Durand
M. A. Schmidt
INVENTOR
Archibald E. Walburn,
BY Milo B. Stevens & Co.
Attorneys,
THE NORRIS PETERS CO., WASHINGTON, D.C.

UNITED STATES PATENT OFFICE.

ARCHIBALD E. WALBURN, OF WICHITA, IOWA.

DRAFT-EQUALIZER.

No. 837,985.　　　　Specification of Letters Patent.　　　　Patented Dec. 11, 1906.

Application filed May 4, 1906. Serial No. 315,173.

*To all whom it may concern:*

Be it known that I, ARCHIBALD E. WALBURN, a citizen of the United States, residing at Wichita, in the county of Guthrie and State of Iowa, have invented new and useful Improvements in Draft-Equalizers, of which the following is a specification.

This invention is a draft-equalizer, and more particularly a device of this kind for equalizing the draft of four animals and overcoming side draft, the parts being so arranged that the animals can pull abreast.

In the accompanying drawings, Figure 1 is a plan view of the invention, and Fig. 2 is a sectional view on the line 2 2 of Fig. 1.

Referring specifically to the drawings, 5 denotes the main evener-lever, carrying at one end, which is the short end, a doubletree 6 and at the opposite or long end a swingletree 7. The lever is connected to the short end of a second lever 8 by a link or strap 9. To the long end of the lever 8 are fastened straps 10, which extend above and below the lever 5 and in front of the same and carry a swingletree 11. The link 9 is adjustably connected to the lever 5 by a bolt or pin 12, which is extended through one of a series of openings 13 in said lever, the bolt serving as a fulcrum for the lever.

Between the straps 10 and the link 9 the lever 8 has a series of openings 14 for a bolt or other suitable means, whereby said lever is adjustably connected to the tongue or clevis of the plow or other implement, said bolt also serving as a fulcrum on which the lever swings.

The fulcrum of the lever 5 will be so located that the pull of the two animals on the short end against the pull of the one animal on the long end will be equalized. The fulcrum of the lever 8 will also be so adjusted that the pull of the three animals on the short end against the pull of the one animal on the long end will be equalized. All the swingletrees extend in a line in front of the lever 5, so that the animals can pull abreast.

The device herein described is simple in construction and effectively serves the purpose for which it is intended. The fulcrum of the levers can be readily adjusted so that the animals will pull even and all side draft is overcome.

I claim—

1. A draft-equalizer comprising a main evener-lever carrying at its short end a doubletree, and at its long end a swingletree, and a second lever carrying at its long end a swingletree, and connected at its short end to the main lever.

2. A draft-equalizer comprising a main evener-lever carrying at its short end a doubletree, and at its long end a swingletree, a second lever behind the main lever having at its long end straps which extend in front of the main lever and carrying a swingletree, and a connection between the short end of the second lever and the main lever.

In testimony whereof I have signed my name to this specification in the presence of two subscribing witnesses.

ARCHIBALD E. WALBURN.

Witnesses:
　　CHESTER FORDYCE,
　　G. W. ANSBERY.